(12) United States Patent
Kim et al.

(10) Patent No.: US 7,295,735 B2
(45) Date of Patent: Nov. 13, 2007

(54) ALL-DIELECTRIC, SELF-SUPPORTING, LOOSE-TUBE OPTICAL FIBER CABLE

(75) Inventors: Kwang-Il Kim, Seoul (KR); Weon-Bae Kim, Gyeonggi-do (KR); In-Sik Choi, Gyeonggi-do (KR)

(73) Assignee: LG Cable, Seoul (KR)

( * ) Notice: Subject to any disclaimer, the term of this patent is extended or adjusted under 35 U.S.C. 154(b) by 0 days.

(21) Appl. No.: 10/534,588

(22) PCT Filed: Feb. 2, 2004

(86) PCT No.: PCT/KR2004/000186

§ 371 (c)(1),
(2), (4) Date: May 10, 2005

(87) PCT Pub. No.: WO2004/074899

PCT Pub. Date: Sep. 2, 2004

(65) Prior Publication Data

US 2006/0159408 A1   Jul. 20, 2006

(30) Foreign Application Priority Data

Feb. 19, 2003   (KR) ............... 10-2003-0010502

(51) Int. Cl.
*G02B 6/44* (2006.01)
(52) U.S. Cl. ............ 385/113; 385/100; 385/109; 385/110; 385/112
(58) Field of Classification Search ............ 385/113
See application file for complete search history.

(56) References Cited

U.S. PATENT DOCUMENTS

| | | | | |
|---|---|---|---|---|
| 4,815,813 A | * | 3/1989 | Arroyo et al. | 385/102 |
| 5,148,509 A | * | 9/1992 | Kannabiran | 385/109 |
| 5,247,599 A | * | 9/1993 | Vyas et al. | 385/113 |
| 5,389,442 A | * | 2/1995 | Arroyo et al. | 428/396 |
| 5,642,452 A | * | 6/1997 | Gravely et al. | 385/113 |
| 5,822,485 A | * | 10/1998 | Nelson et al. | 385/112 |
| 6,167,180 A | * | 12/2000 | Keller | 385/113 |
| 6,714,709 B1 | * | 3/2004 | Birkeland et al. | 385/111 |

FOREIGN PATENT DOCUMENTS

| | | |
|---|---|---|
| KR | 1998-084993 A | 12/1998 |
| KR | 1999-018081 A | 3/1999 |

OTHER PUBLICATIONS

International Search Report.
Written Opinion of the International Searching Authority, no date.

\* cited by examiner

*Primary Examiner*—Frank G. Font
*Assistant Examiner*—Ryan Lepisto
(74) *Attorney, Agent, or Firm*—Jones Day

(57) ABSTRACT

A method for producing an optical fiber cable which improves stability by attaching an Aramid yarn near the core in parallel to an axial direction of the optical cable and solves structural problems of the cable by soaking an Aramid yarn into an epoxy resin is disclosed. This optical cable producing method uses a tensile material for improvement of tensile property, and includes the steps of soaking the tensile material into an epoxy resin, and attaching the tensile material to the optical cable in parallel to the axial direction of the optical cable.

7 Claims, 2 Drawing Sheets

ALL-DIELECTRIC, SELF-SUPPORTING, LOOSE-TUBE OPTICAL FIBER CABLE

TECHNICAL FIELD

The present invention relates to arrangement and fixing method of a tension member for an all-dielectric self-supporting (ADSS) optical cable, and more particularly to an optical cable capable of improving tensile force of the cable and preventing structural instability caused by bending.

BACKGROUND ART

Recently, demands for optical communication are abruptly increased in concert with the development of information communication techniques. Accordingly, the demand for the optical cables is also tending to increase. ADSS (All-Dielectric Self-Supporting Cable) is one of aerial optical cables. This ADSS cable is designed to include 2 to 144 strips of optical fibers.

Main features of the ADSS cable are that it is a completely nonmetallic cable, and capable of self-supporting. In addition, high tensile strength and tracking resistance are possessed therein. Moreover, the ADSS cable may be installed using an existing pylon with a low construction cost, so the ADSS cable is expected to show increased demand in the future.

The ADSS cable generally includes a core having an optical fiber unit and positioned at the center, and a sheath for protecting the core. Since the ADSS cable should ensure a life for a long time (about 30 years), relevant mechanical performance of the cable such as tensile property and bending of the cable is essential. In order to improve the tensile property of the ADSS cable, a tensile member is respectively adopted between the core and the sheath.

Conventionally, a tensile member in which an Aramid yarn is stranded with keeping regular pitches is used in the aforementioned sheath. However, this conventional method shows a deteriorated tensile property in an axial direction of the cable due to the load dispersion in a radial direction according to the Wire Rope theory, rather than the linear member. In addition, the cable is extended due to its own weight after the optical cable is installed, thereby generating a torsion, which is a factor of performance deterioration.

However, despite such problems; the reason of stranding the Aramid yarn in the convention method is that it prevents structural instability of the cable caused by inclination of the Aramid yarn, which is apt to be generated in bending the cable.

As described above, the conventional method for manufacturing an optical cable arouses deterioration of the tensile property and torsion of the cable, thereby giving optical losses and exerting a bad influence upon the life of the cable. In order to solve these problems, an improved method is proposed to use SZ-stranding, namely doubly stranding the Aramid yarn in opposite directions with keeping the pitch as it is.

However, the SZ-stranding method requires to add a complex process in the optical cable manufacturing procedure, thereby arousing several problems, such as increase of a production cost and a weight of the cable. In addition, since this method cannot be applied to an optical cable having a small diameter, the Aramid yarn should be stranded in one direction in such an optical cable.

DISCLOSURE OF INVENTION

The present invention is designed to solve the problems of the prior art, and therefore an object of the invention is to provide an ADSS cable capable of showing an excellent tensile property together with preventing structural instability, which is apt to be generated during a bending behavior of the optical cable.

In order to accomplish the above object, the present invention provides an ADSS optical cable including a central tensile member extended in a longitudinal direction; at least one optical fiber for transmitting an optical signal; at least one tubular buffer receiving the at least one optical fiber therein and arranged around the central tensile member adjacently, the tubular buffer being twisted on the center of the central tensile member; an inner sheath extended in the longitudinal direction with surrounding the at least one tubular buffer; an outer tensile member extended in the longitudinal direction with surrounding the inner sheath; and an outer sheath extended in the longitudinal direction with surrounding the outer tensile member, wherein the outer tensile member includes a plurality of tensile wires extended in the longitudinal direction in parallel without intentional twisting on the central tensile member; and an adhesive resin for connecting the tensile wires adjacent to each other.

In addition, the outer tensile member is preferably configured so that the plurality of tensile wires arranged in parallel without intentional twisting are soaked in the adhesive resin.

BRIEF DESCRIPTION OF THE DRAWINGS

These and other features, aspects, and advantages of preferred embodiments of the present invention will be more fully described in the following detailed description, taken accompanying drawings. In the drawings.

BEST MODES FOR CARRYING OUT THE INVENTION

Hereinafter, preferred embodiments of the present invention will be described in detail with reference to the accompanying drawings.

Figure 1:
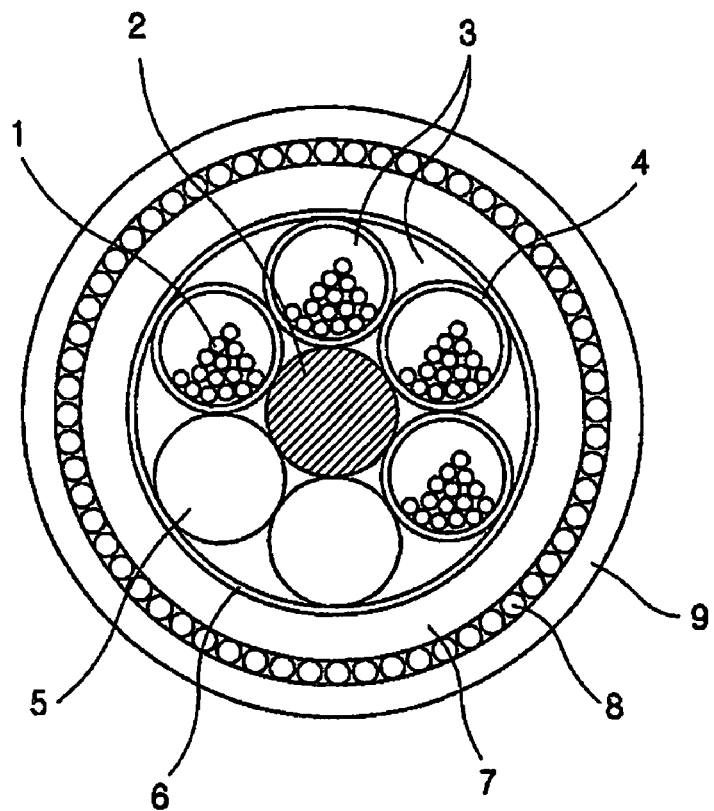
FIG. 1 is a sectional view showing an ADSS cable according to a preferred embodiment of the present invention.

FIG. 1 is a sectional view showing an ADSS (All-Dielectric Self-Supporting) optical cable according to a preferred embodiment of the present invention.

As shown in FIG. 1, the optical cable of the present invention has a central tensile member 2 extended in a longitudinal direction. The central tensile member 2 has substantial tensile strength and compressive strength.

Around the central tensile member 2, at least one optical fiber aggregation is stranded or at least one optical fiber aggregation and at least one filler 5 are stranded together.

The optical fiber aggregation is composed of at least one optical fiber 1 and a tubular buffer 4 loosely surrounding the optical fiber 1. That is to say, the optical fiber 1 is loosely received in the tubular buffer 4.

The optical fiber 1 is preferably SMF (Single Mode Fiber), MMF (Multiple Mode Fiber), DSF (Dispersion Shift Fiber) or NZDSF (Non-Zero Dispersion Shift Fiber), having a core layer and a clad layer.

The tubular buffer 4 is formed by extrusion in the longitudinal direction with receiving the at least one optical fiber 1. The tubular buffer 4 preferably adopts a thermoplastic resin, particularly PBT (polybutyleneterephthalate).

A well-known waterproof jelly 3 is filled in the tubular buffer 4, namely in a gap between the optical fibers 1.

The filler 5 surrounding the central tensile member 2 together with the optical fiber aggregation is preferably made of polyethylene material.

In addition, the optical cable of the present invention may include a conventional water-blocking tape 6 extended in the entire length of the cable with surrounding the optical fiber aggregation. This water-blocking tape 6 may be made of water-absorbing materials or contain such materials. A gap between the tubular buffer 4 in an inner space surrounded by the water-blocking tape 6 is also preferably filled with a well-known waterproof jelly 3.

In addition, the optical cable of the present invention includes an inner sheath 7 extended in the longitudinal direction with surrounding the water-blocking tape 6. This inner sheath 7 is formed by extruding polymer materials such as black polyethylene around the water-blocking tape 6.

Figure 2:
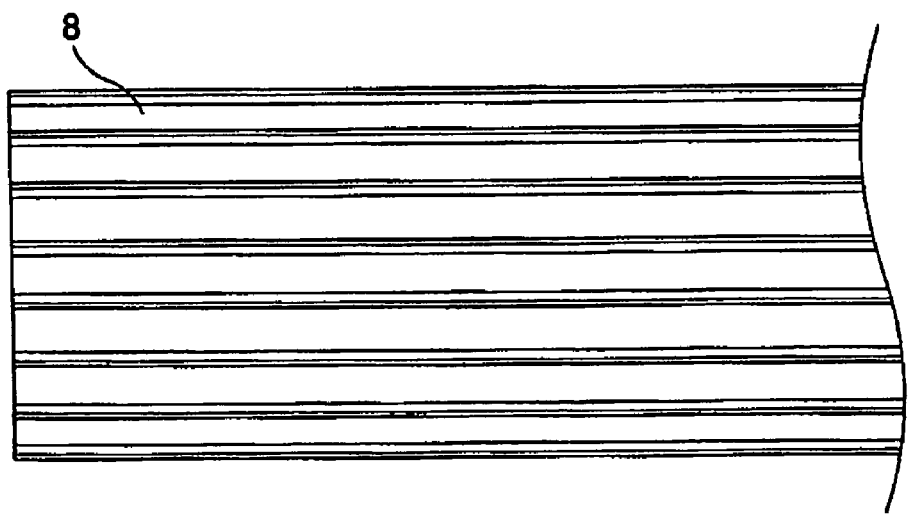
FIG. 2 shows a structure of an external tensile member according to the present invention.

The optical cable of the present invention may further include an outer tensile member 8 extended in the longitudinal direction of the cable. The outer tensile member 8 is configured as shown in FIG. 2.

That is to say, the outer tensile member 8 includes a plurality of tensile wires extended in the longitudinal direction in parallel without any intentional twisting, and an adhesive resin for connecting the tensile wires. The tensile wire preferably adopts an Aramid yarn, and the adhesive resin preferably adopts an epoxy resin having excellent adhesive force together with superior mechanical features.

The outer tensile member 8 is made by arranging Aramid yarns in parallel without any intentional twisting, and then soaking the Aramid yarns in the epoxy resin. If the Aramid yarn is soaked in the epoxy resin as mentioned above, the epoxy resin is completely permeated into pores between the Aramid yarns to generate the tensile member configured as shown in FIG. 2.

The Aramid yarn supports tensile force applied to the cable after installation, and the adhesive resin increases combining force between broken Aramid yarns and improves structural instability of the Aramid yarn, which is apt to arise when the cable is bent.

The optical cable of the present invention may further include an outer sheath 9 extended in the longitudinal direction with surrounding the outer tensile member 8. The outer sheath 9 is also formed by extruding polymer materials such as black polyethylene around the outer tensile member 8, similarly to the inner sheath 7.

In the conventional method, a loss of the tensile property occurs due to a radial component of force generated in the optical cable. However, in the present invention, since the tensile member is attached to the cable in a straight way, namely so that the tensile member has an infinite pitch, 100% of the tensile property may be entirely used as an axial tensile force of the cable.

Thus, it is possible to make an optical cable having excellent performance with a small amount of tensile materials rather than the conventional making method. In addition, since the torsion generated in extending the optical cable may be removed, the present invention may ensure more stable performance of the optical fiber.

Moreover, the epoxy resin of the present invention combines the partially broken tensile materials, thereby improving the tensile strength better than the conventional tensile materials. In addition, after the epoxy resin is cured, the excellent mechanical performance of the epoxy resin makes the cable keep structural stability when the cable is bent.

Advantages of the present invention will be more apparent from the following comparative embodiments described below.

COMPARATIVE EMBODIMENT 1

Figure 3:
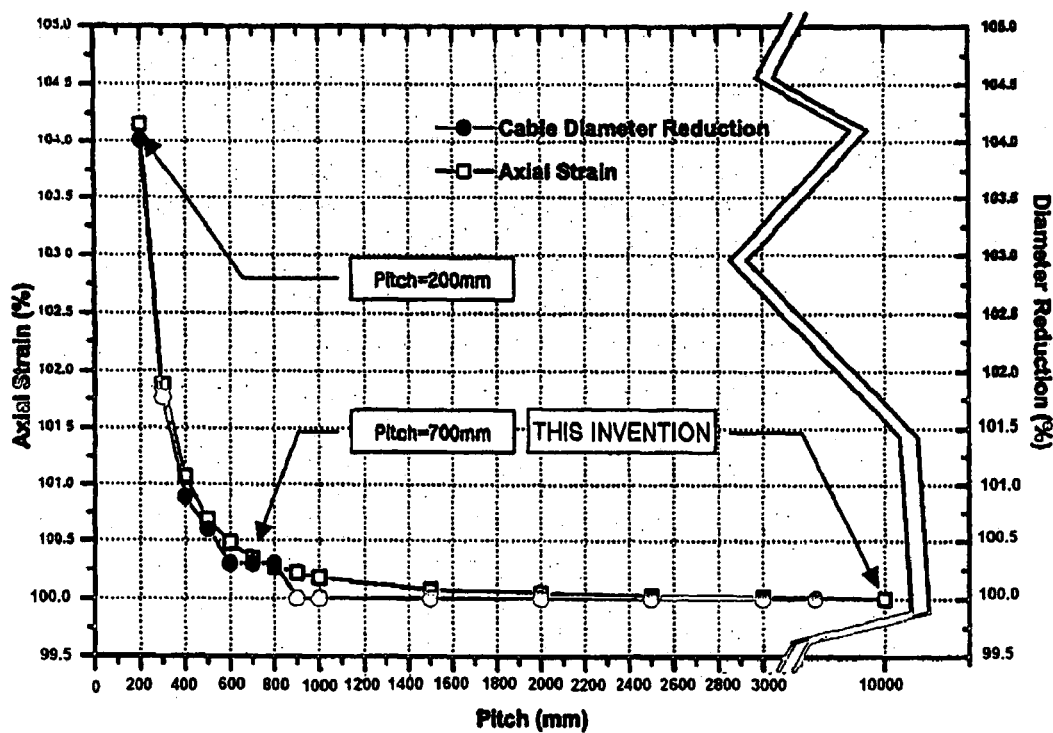
FIG. 3 shows the axial strains of the ADSS optical cable made by the present invention and the axial strains of the optical cable made by the conventional method.

Axial strains (or, tensile properties) of the ADSS optical cable made by the present invention and the optical cable made by the conventional method are comparatively measured, and the results are shown in FIG. 3.

The conventional cable used in this comparative evaluation has a pitch of 200 mm, 500 mm, 700 mm, 1000 mm or infinite, and the tensile property of the cable is evaluated at first.

Comparing the optical cable of the present invention with the conventional optical cable in view of tensile property, it would be known that the optical cable of the present invention shows 100% of tensile property. Meanwhile, the conventional optical cable cannot realize the tensile property of the optical cable up to 100% since diameter reduction is increased as the pitch is small. In addition, the axial strain of the optical cable is increased according to such a result, thereby generating stress on the optical fiber. Resultantly, this stress acts as a factor of causing an optical loss.

COMPARATIVE EMBODIMENT 2

Figure 4:
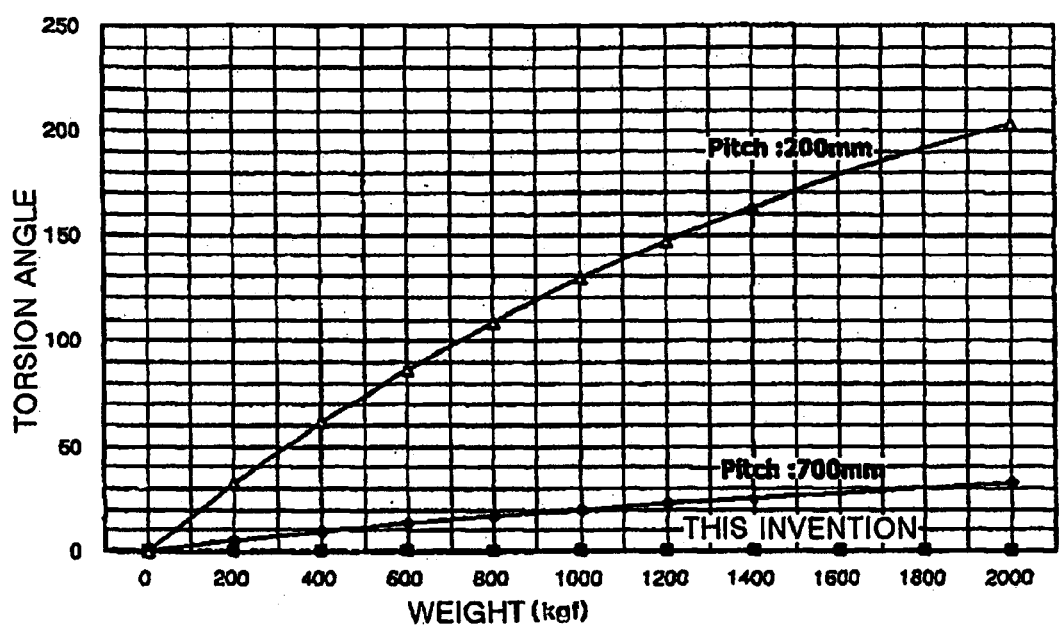
FIG. 4 shows the results of experiments for torsion of the ADSS optical cable made by the present invention and of the optical cable made by the conventional method.

The comparative embodiment 2 performs comparative experiments for torsion of the ADSS optical cable made by the present invention and the optical cable made by the conventional method. Its measurement results are well shown FIG. 4.

The present invention also shows nearly no torsion like the results of the comparative embodiment 1. Thus, the ADSS optical cable of the present invention shows more excellent torsion stability than the optical cable made by the conventional method.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

According to the present invention, it is possible to make an optical cable with excellent mechanical tensile properties together with giving a solution to the structural instability of the optical cable by soaking the tensile materials into the epoxy resin.

In addition, by using a smaller amount of tensile materials, a cost for making the optical cable is lowered.

What is claimed is:

1. An ADSS (All-Dielectric Self-Supporting) optical cable comprising:

a central tensile member extended in a longitudinal direction;

at least one optical fiber for transmitting an optical signal;

at least one tubular buffer receiving the at least one optical fiber therein and arranged around the central tensile member adjacently, the at least one tubular buffer being twisted on the center of the central tensile member;

an inner sheath extended in the longitudinal direction surrounding the at least one tubular buffer;

an outer tensile member having the form of a substantially cylindrical sheet extended in the longitudinal direction surrounding the inner sheath; and an outer sheath extended in the longitudinal direction surrounding the outer tensile member;

wherein the outer tensile member includes:

a plurality of tensile wires extended in the longitudinal direction in parallel without intentional twisting on the central tensile member, each tensile wire having a longitudinal axis, the respective longitudinal axes each lying substantially in the same cylinder; and a thermosetting adhesive resin for connecting the tensile wires adjacent to each other, wherein the thermosetting adhesive resin permeates the spaces between the wires such that any broken wires effectively remain combined together, wherein the outer tensile member is configured so that the plurality of tensile wires arranged in parallel without intentional twisting are soaked in the adhesive resin.

2. An ADSS optical cable according to claim 1, wherein the tensile wire is an Aramid yarn.

3. An ADSS optical cable according to claim 1, wherein the adhesive resin is an epoxy resin.

4. An ADSS optical cable according to claim 1, further comprising at least one polyethylene filler arranged around the central tensile member adjacently and twisted on the center of the central tensile member together with the at least one tubular buffer.

5. An ADSS optical cable according to claim 1, further comprising a water-blocking tape arranged in the inner sheath surrounding the at least one tubular buffer to prevent external moisture from penetrating into the optical fiber.

6. An ADSS optical cable according to claim 5, further comprising a waterproof jelly filled in a gap between the optical fibers in the at least one tubular buffer and in a gap between tubular buffers in the water-blocking tape.

7. An ADSS optical cable according to claim 1, wherein the plurality of optical fibers are loosely received in the at least one tubular buffer.

* * * * *